(12) United States Patent
Busropan

(10) Patent No.: US 7,110,760 B1
(45) Date of Patent: Sep. 19, 2006

(54) ACCESS-POINT-DEPENDENT RATE FIXING OF TELECOMMUNICATION LINKS

(75) Inventor: Bryan Jerrel Busropan, Leidschendam (NL)

(73) Assignee: Koninklijke KPN N.V., The Hague (NL)

( * ) Notice: Subject to any disclaimer, the term of this patent is extended or adjusted under 35 U.S.C. 154(b) by 0 days.

(21) Appl. No.: 09/890,641

(22) PCT Filed: Jan. 24, 2000

(86) PCT No.: PCT/EP00/00490

§ 371 (c)(1),
(2), (4) Date: Jul. 31, 2001

(87) PCT Pub. No.: WO00/51333

PCT Pub. Date: Aug. 31, 2000

(30) Foreign Application Priority Data

Feb. 22, 1999 (NL) .................................... 1011358

(51) Int. Cl.
*H04B 7/00* (2006.01)
*H04M 15/00* (2006.01)
*H04L 12/66* (2006.01)
*H04L 12/28* (2006.01)
*H04L 12/54* (2006.01)

(52) U.S. Cl. ................ 455/432.1; 455/439; 455/456.1; 379/114.01; 370/352; 370/389

(58) Field of Classification Search ................ 455/406, 455/422, 456.1, 439, 432.1; 370/332, 352, 370/389; 709/201; 379/11.01, 114.01
See application file for complete search history.

(56) References Cited

U.S. PATENT DOCUMENTS

| 5,438,568 | A | * | 8/1995 | Weisser, Jr. .................. 370/389 |
| 5,457,680 | A | * | 10/1995 | Kamm et al. ................ 370/332 |
| 5,457,736 | A | * | 10/1995 | Cain et al. ................... 455/439 |
| 5,787,354 | A | * | 7/1998 | Gray et al. ............... 455/456.1 |
| 5,812,639 | A | * | 9/1998 | Bartholomew et al. ..... 370/352 |
| 5,950,125 | A | * | 9/1999 | Buhrmann et al. ...... 455/432.1 |
| 6,330,586 | B1 | * | 12/2001 | Yates et al. .................. 709/201 |
| 2003/0123628 | A1 | * | 7/2003 | Rhodes .................. 379/114.01 |

FOREIGN PATENT DOCUMENTS

| WO | WO 96/39000 A1 | 12/1996 |
| WO | WO 97/13387 A1 | 4/1997 |
| WO | WO 97/37503 A1 | 10/1997 |
| WO | WO 99/05875 A1 | 2/1999 |

* cited by examiner

Primary Examiner—William D. Cumming
(74) Attorney, Agent, or Firm—Frishauf, Holtz, Goodman & Chick, P.C.

(57) ABSTRACT

For the access-point dependent calculation of telecommunication rates by way of a network, connecting data is generated in response to obtaining and using, by a subscriber or group of subscribers, telecommunication links. The connection data contains data identifying a network-access point used by a subscriber. During a specific period of time, there is stored connecting data in a connecting-data file. By, as a function of data on access points used in the period of time by a subscriber or a group of subscribers, determining to which of the access points there are coupled rates specific to the subscriber in question or group of subscribers, access-point-dependent rating is made possible in a simple and automatically self-regulating way. A system for applying the proposed way of rating is described as well.

13 Claims, 3 Drawing Sheets

| SUBSCR. | CONN. CAT. | DURAT. | CELL | TIME |
|---|---|---|---|---|
| | | | | |

ACCESS-POINT-DEPENDENT RATE FIXING OF TELECOMMUNICATION LINKS

CROSS-REFERENCE TO RELATED APPLICATIONS

This application is a U.S. National Phase Application under 35 USC 371 of International Application PCT/EP00/00490 (published in English) filed Jan. 24, 2000.

The invention relates to a method for access-point-dependent determination of rates for telecommunications, as well as to a telecommunications system arranged for access-point-dependent computation of telecommunication rates.

BACKGROUND OF THE INVENTION

It is known from practice, depending on the location of a subscriber—or at any rate on an apparatus bearing a subscriber identification—within a cellular network for mobile telephony to invoice several rates to the subscriber.

In order to better compete, e.g., in situations where the subscriber is located close to home or to his job, and therefore may relatively simply dispose of a connection by way of the nonmobile telephone network, against links by way of said nonmobile telephone network, some providers of mobile telephony invoice a reduced rate for conversations in the home zone. For conversations from locations outside said zone, on the contrary, the customary mobile rate is invoiced.

In practice, the zone in which a discount is offered is determined by the cell (the base transceiver) which best covers the location of the home base of the subscriber in question. Said cell constitutes the access point by way of which the subscriber, when making a link, gains access to the telecommunications network.

This way of determining the subscriber's zone, however, leads to several objections.

To start with, the access point must be determined in advance, e.g., by determining, at the home or office location of the subscriber, with which cell there is made a link, which is very laborious. Determination by way of plan views or maps which indicate the range of various cells is unreliable, since the transmission ranges, particularly in urban and hilly surroundings, may have craggy and surprising contours.

Secondly, it is of special importance to the subscriber that it be known whether at specific positions, where he wants to call often, there may be called at the reduced rate. After all, the subscriber will like to ascertain whether, from a location from which there is called frequently, there is not structurally called at the high rate. Said communication of the rate or the cell used requires additional provisions and complicates the use of the network.

Thirdly, in this method of determining the zones in which a different rate is computed, it is laborious that in the event of the home zone or the office zone being changed, it must be determined anew what is the new access point determining the zone in question. In addition, subsequent to the change, rates must then be calculated otherwise in a first part of a period than in a second part of said period.

Fourthly, through reconfiguration of the network, e.g., by adding a base station, the zone in which the home locations or office locations of a large number of subscribers are located, may change as well, which, in a considerable area, once again requires the redetermination of the access points associated with subscribers which determine the zone in question, in order to guarantee that no great number of subscribers at, e.g., the home location or the office location, remains deprived of a reduced rate.

Fifthly, under the influence of, e.g., weather conditions, the demand for links, the side of a building where the subscriber is located, and the position in which a telephone set is held, at or already close to the exact home location or office location, there may be made contact with another cell than the one which, at the initial determination, was determined as a serving cell and therefore as a special access point. As a result, the reduced rate cannot be offered to many subscribers in a reliable manner.

BRIEF SUMMARY OF THE INVENTION

An object of the invention is to facilitate access-point-dependently rating telecommunication links in a simpler, more flexible and, at least in the long run, more reliable manner.

According to the present invention, said object is realised by determining the access point wherein, for a specific subscriber, specific rates are coupled to be carried out as laid down in claim 1. The invention may also be embodied in a system according to claim 8, which is specifically arranged for carrying out the method according to claim 1.

Determining rates is thus not carried out in advance and statically, but on an empirical basis and, depending on the duration of the period considered, carried out more or less dynamically. As a result, it is not necessary to determine in advance which access point is allotted to a subscriber, while it is guaranteed to the subscriber that a specific rate is coupled to the access point or a number of access points most used by said subscriber. If the use of access points is subject to modification, irrespective of whether such is due to modified circumstances on the part of the subscriber or on the part of the network, there automatically occurs a modification of the access point or the access points to which specific rates are coupled.

A particular advantage of said method is that it can also be used for access-point-dependent determination of rates for telecommunication by way of the nonmobile telephone network when there is called using calling cards and invoicing thus does not occur on the basis of the access point from which a link was established.

A still further advantage is that it is also possible to dynamically couple the access-point-dependence of rates for using a network to the use of access points of a different network. Thus, access points to which special rates for using a mobile network are coupled, may be determined as a function of the use of access points of a nonmobile network, such as the telephone network or a cable-television network by the same subscriber, e.g., using a calling card or a password stored in a computer of the subscriber for gaining access to a service provider, associated with the subscription to the mobile network. In doing so, relations between the use of access points of a network and access points of a different network, e.g., a mobile network and a nonmobile network or a cable-television network, may also be determined by statistical analysis of connecting data.

Particularly advantageous embodiments of the invention are described in the dependent claims.

Further objects, elaborations, effects and details of the invention will be clear from the following description of an exemplary embodiment, reference being made to the drawing. Here:

Figure 4:
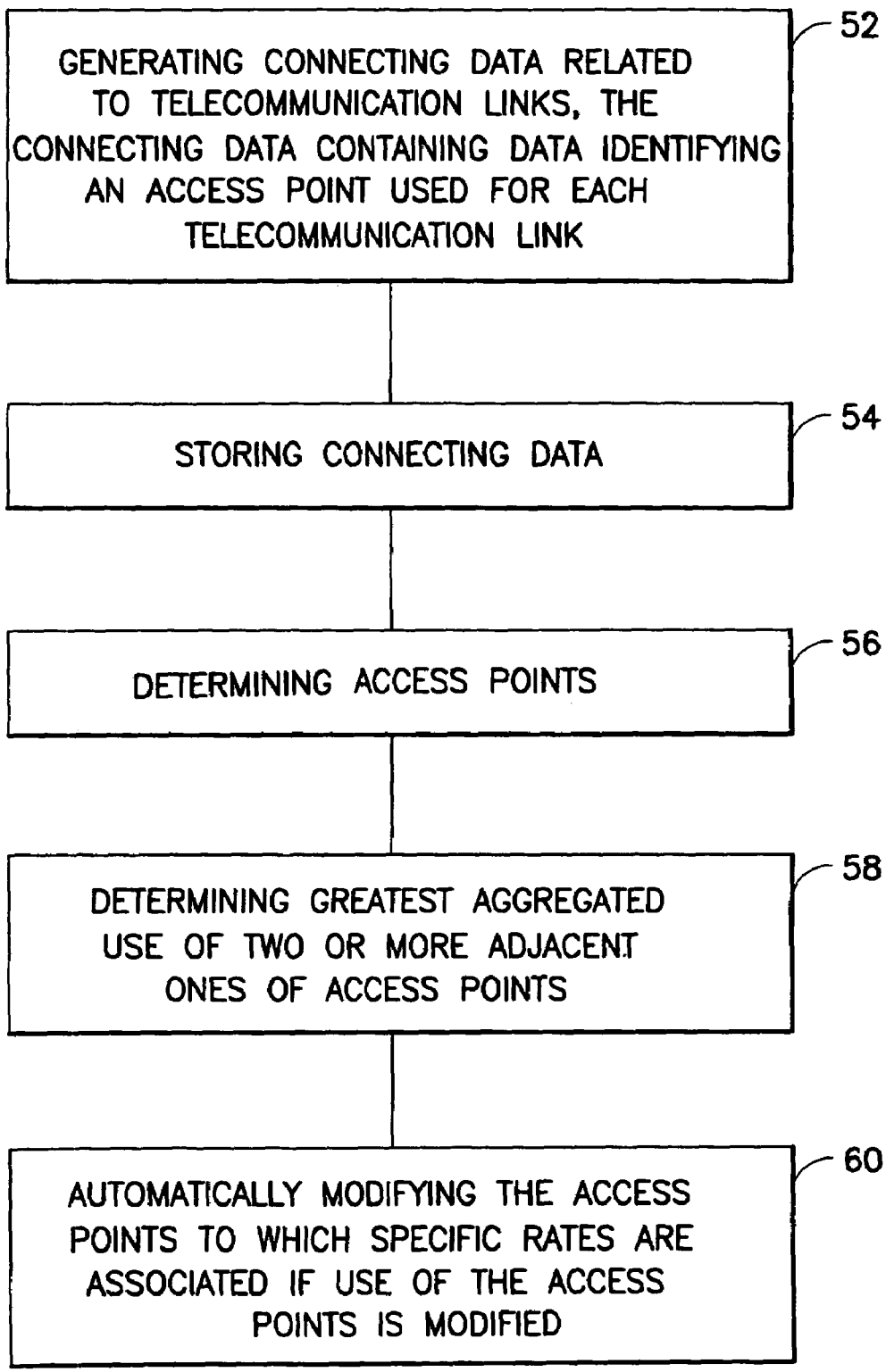
FIG. 4 shows the method according to the present invention.

The method for access-point dependent calculation of telecommunication rates by way of a specific network will now be described in connection with FIG. 4. The method includes generating connecting data in response to obtaining and using, by a subscriber or a group of subscribers, telecommunication links (3–10), which connecting data each time contains data that identifies a network-access point (11–18, 48) used by a subscriber (Step 52). During a specific period of time, connecting data is stored in a connecting-data file (30) (Step 54). As a function of data on access points (11–18, 48) used by a subscriber or group of subscribers in the period of time, the access points to which rates determined for the subscriber or group of subscribers are coupled are determined (Step 56). During the determination as a function of data on access points used in the period of time, the greatest aggregated use of two or more adjacent ones of the access points by the subscriber or group of subscribers is determined (Step 58). Then, the access points are automatically modified to which specific rates are associated if use of the access points is modified (Step 60). The method of the present invention will be described in greater detail in connection with the apparatus described below in connection with FIG. 1.

Figures 1, 2:
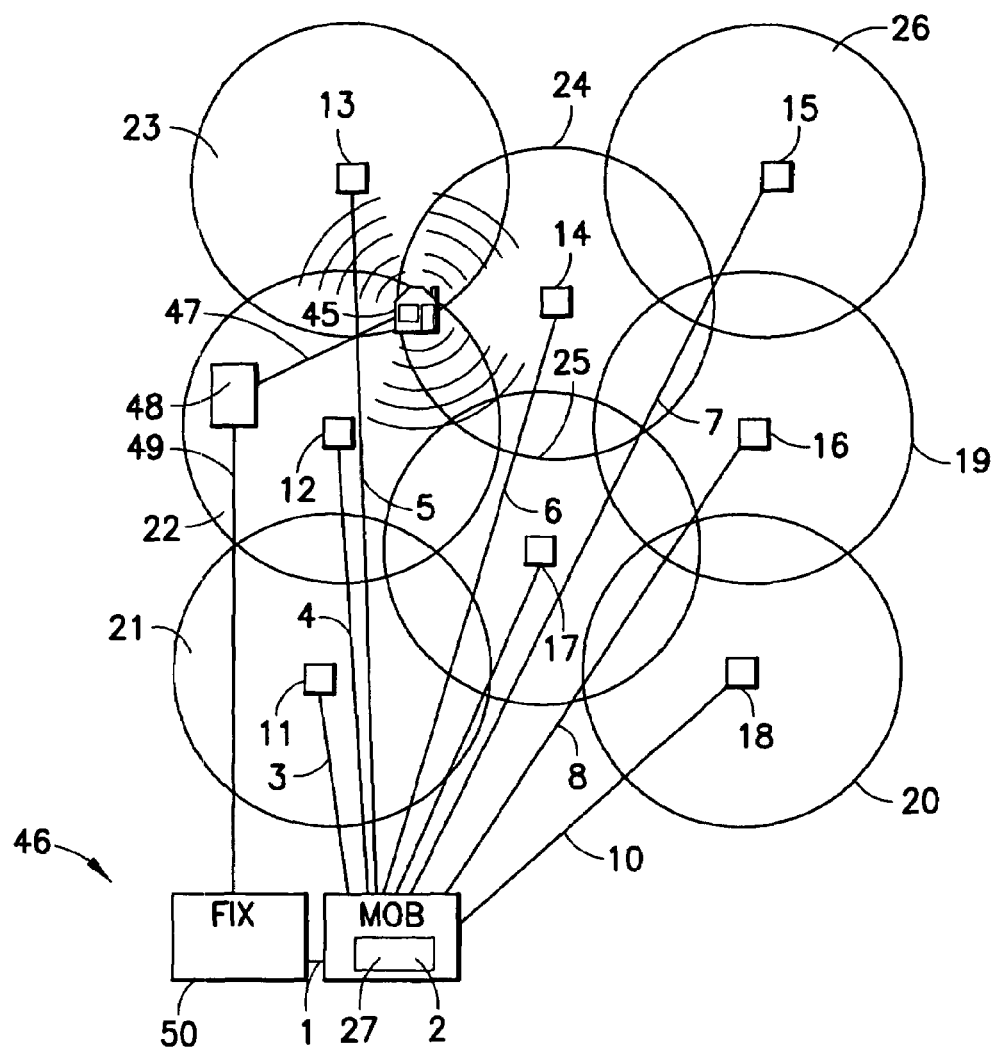
FIG. 1 shows a schematic representation of a portion of a mobile network and a portion of a nonmobile network.
FIG. 2 shows a table having connecting data.

The telecommunications system, proposed by way of example, a portion of which is shown in FIG. 1, comprises a nonmobile network and a mobile network having a connection 1 to the nonmobile network. Below, the mobile network will first be described in greater detail.

The mobile telecommunications network is composed of an exchange 2, to which connections 3–10 (remaining ones not further shown) to cellular base stations are connected. Said connections may have a branched structure, but this is not relevant for the application to be described here and therefore they are omitted here for clarity's sake. The base stations control mobile telephone sets of subscribers and guest subscribers (e.g., subscribers to networks in other countries) in associated zones 19–26.

Figure 3:
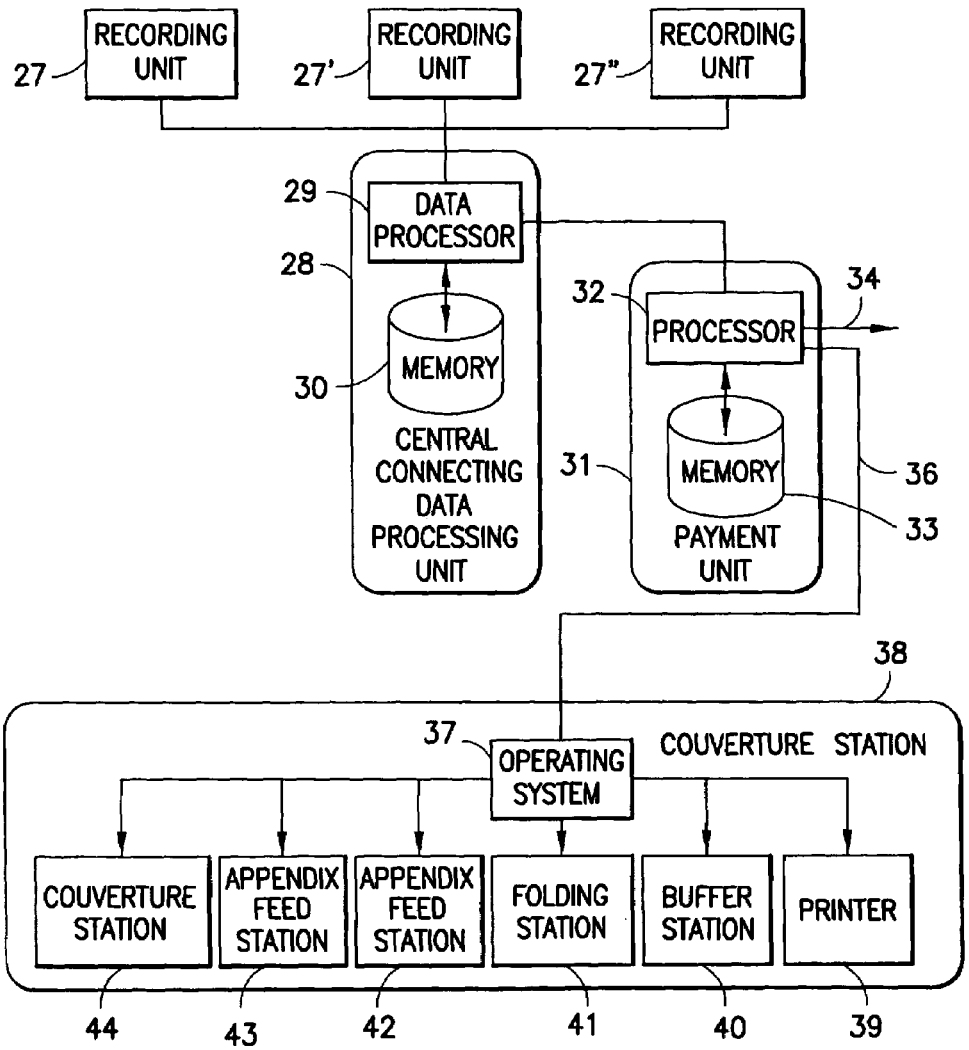
FIG. 3 shows a representation of the architecture of a system for implementing the invention.

The exchange contains a recording unit 27 for generating connecting data relating to telecommunication links obtained and used by subscribers. As shown in FIG. 3, several recording units 27, 27', 27" in several exchanges are provided for in order to be capable of recording connecting data relating to links obtained from several regions. For processing connecting data, there is provided for a central connecting-data-processing unit 28 which is composed of, inter alia, a data processor 29 and a memory 30 for storing as a connecting-data file, during a specific time period, the connecting data generated by the recording units.

As shown in FIG. 2, the connecting data each time contains data which shows a subscriber, a connection catagory (e.g., local, trunk, international group A, international group B etc.), the duration of a link, the cell used as an access point, and the point in time (including the date) of obtaining, or interrupting, the link, and constitute a connecting-data table.

The system further comprises a payment unit 31 for invoicing links in accordance with connecting data stored in memory 30 of the central connecting-data-processing unit 28. For this purpose, a processor 32 of the payment unit 31 is connected to the processor 29 of the central connecting-data-processing unit 28, and the payment unit is provided with a memory 33 for storing payment data to be processed.

The processor 32 of the payment unit 31 is arranged for determining, for each subscriber or group of subscribers, as a function of access points used in a period of time, to which of the access points 11–18 for the subscriber in question specific rates are coupled, and for subsequently determining amounts to be invoiced in accordance with the connecting data.

For settling the specific amounts and notifying the subscribers of the specific amounts, the processor 32 of the payment unit 31 is connected, by way of a mobile link 34, to a settlement system, such as a payment system of a bank for processing automatic payments by subscribers who issued a power of attorney to this effect.

Furthermore, the processor 32 of the payment unit 31 is connected, by way of a link 36, to an operating system 37 of a printer and couverture system 38 for printing and finishing invoices, provided with a printer 39, a buffer station 40, a folding station 41, appendix-feed stations 42, 43, and a couverture station 44.

FIG. 1 shows a home location of a subscriber A by way of example. Assuming the wish to offer subscriber A a more favourable rate for mobile telephony, if from the home or from the neighbourhood of the home (e.g., from the garage or from the garden or possibly from the suburb), the problem arises that it must be determined from where subscriber A is calling.

This may be effected by repeatedly recording by way of which access point 11–18 subscriber A obtains a link. To this end, however, it would first have to be determined which access point serves the home location of subscriber A. In this connection, the problem arises that the home location of subscriber A is situated in such a manner that, depending on the side of the house where subscriber A is located, three of the base stations are capable of communicating with the telephone set of subscriber A. In this connection, weather conditions and other variable conditions, such as the demand for links by way of various access points and the position in which the telephone set is held, may also play a rôle. This is why, particularly in situations such as those of the home location 45 of subscriber A, it is not very well possible to reliably determine which of the access points 11–18 is associated with the location of subscriber A. Furthermore, it is laborious for a register to be updated which indicates, for each subscriber, the access points by way of which the subscribers in question are permitted to call at a reduced rate.

In the system proposed, said problems are solved by the fact that the determination by way of which the access points 11–18 may be called at a reduced rate, occurs as a function of access points used by subscriber A in a specific period of time.

This may be carried out, inter alia, by identifying which of the access points 11–18 is most frequently used during a specific period of time. In order, in situations such as those of subscriber A, to guarantee that from the home location 45 there may always be called at the economic rate, however, it is preferable to determine which group of three (or, depending on the structure of the network, two, four or over) neighbours of the access points 11–18 is most frequently used by subscriber A, and coupling the reduced rate to said group of access points. In order not to provide subscribers located in the centre of a zone with an unnecessarily large advantageous zone, there may also be provided for a situation in which, apart from the access point most frequently used, no reduced rate is coupled to access points if the use thereof over a specific period of time does not determine at least 5%, 10%, 20% or another suitably chosen percentage of the use of the most frequently used access point. The rules for selecting the access point to which reduced rates are coupled can also be made dependent on the access points, e.g., to take into account the fine-meshedness and the degree of overlap between care zones 19–26 in a specific area.

It should be noted, however, that the period of time over which the intensities of use of access points per subscriber are considered, need not coincide with the period of time to which a payment relates. Depending on the desired balance between reaction speed and stability, there may be chosen a larger or smaller progressing time window to be considered.

The proposed system of access-point-dependent debiting of several rates is particularly attractive where it concerns debiting rates for the use of a mobile network, the access points being constituted by transmitters and receivers of said network. In such networks, after all, users are especially mobile in so far as the use of several access points is concerned, and determining an access point associated with the home location is more difficult than in the event of a nonmobile network.

The proposed method of determining advantageous access points, however, may also be used particularly advantageously in combination with other networks, such as nonmobile telephone networks or communication by way of cable-television networks, subscribers or members of a group of subscribers repeatedly, at any rate before, at or after obtaining a link, identifying themselves to the network by way of an access-point-independent identification code. In this connection there may be thought of, e.g., calling using calling cards, or logging in using a data-processor system in a server offering telecommunications facilities.

A further example of the proposed method of determining access points to which a reduced rate must be coupled is, that the data relating to access points used by subscribers may also be used for determining other communication to be focused on said subscriber. If, e.g., in any of the appendix-feed stations 42, there is placed information on car holidays, it is advantageous to add appendices from said station only to invoices for subscribers who at least have a specific frequency of use or a relative frequency of use on access points along major motorways.

The system proposed by way of example is further provided with a link to another network 46, with the recording unit 27, the central connecting-data-processing unit 28 and the link 1 being arranged for receiving and recording connecting data relating to the use of access points of the other network 46. At the home location, after all, there is also located a link to a connection 47 of the nonmobile network 46, which connection 47 is connected, by way of a node 48 serving as an access point and a trunk line 49, to an exchange 50. It is also possible, meanwhile, to use the individual connections of subscribers as an access point.

According to this example, here the determination to which of the access points 11–18 of the mobile network advantageous rates are coupled for a specific subscriber or group of subscribers, is at least partly carried out in response to data relating to the use of individual access points 48 of the other, nonmobile telephone network by said subscriber or said group of subscribers. For this purpose, a number of access points 11–14 of the mobile network are coupled to the access point 48 of the nonmobile network. If, for a specific subscriber, the access point 48 of the nonmobile network is the access point most frequently used, the reduced rate for mobile links is coupled, as an default setting, to the access points 11–13, 15 of the mobile network. The determination of the access points of the mobile network to which reduced rates are assigned, may subsequently be refined and/or adjusted on the basis of frequencies of use of the access points 11–18.

In order, in situations in which a subscriber A does not or very infrequently use the mobile network from the home location, not to proceed with the offer of a reduced rate from another location, there is also preferably coupled, to the access point of subscriber A to the nonmobile network, a more ample maximum collection of access points for mobile communication, which are eligible for the reduced-rate setting. When determining the access points to which the reduced rate for subscriber A is coupled, the other access points for mobile communication are simply left out of consideration.

In this manner, the reduced rate may be offered with greater reliability only in the event of communication from the home location.

When, as in this example, one of the networks is a nonmobile network and the other one of the networks is a mobile network, communication by way of the mobile network may be offered, in an exceptionally precise and reliable way, at the location where s/he has the easiest access to the nonmobile network.

In order to also facilitate the determination of the access points 11–18 of the mobile network, which must be associated with a specific access point of the other, nonmobile network 46 in a reliable and computerised, self-regulating way, the determination of the access points 11–18 of the mobile network to which, for a subscriber or group of subscribers, special rates are coupled in response to data on the use of individual access points 48 of the nonmobile network 46, is carried out on the basis of statistical relationships between the use of individual access points 11–18 of the mobile network and individual access points 48 of the nonmobile network, by subscribers to both networks in general, respectively. This way, there is automatically obtained a pattern of relationships between both networks, which adjusts itself if changes occur in any of the networks or in the surroundings of the users.

The invention is also applicable in situations in which the one network is a wide-area network applicable on the basis of identification of a subscriber, and in which the other network is an upstream, more fine-meshed network. In said situation, e.g., when obtaining a link by way of the wide-area network by way of an access point of the other network associated with a home location, there may be offered a more favourable rate than in situations in which the link is obtained by way of another access point. For this purpose, there may be used, e.g., a conventional number-recognition technique to determine the access point used by a subscriber.

It will be understood by those skilled in the art that, within the framework of the invention, there are still possible many different embodiments than the one proposed by way of example. Thus, instead of the home location, there may also be chosen the office location as a starting point for selecting access points to which adjusted rates must be coupled.

The invention claimed is:
1. A method for access-point dependent calculation of telecommunication rates by way of a specific network, the method comprising the steps of:
   generating connecting data relating to telecommunication links obtained and used by a subscriber or a group of subscribers, said connecting data containing data identifying an access point used for each telecommunication link,
   using said data identifying the access point used for each telecommunication link to associate a specific rate to an access point or a plurality of access points most used by said subscriber or group of subscribers, and automatically modifying the access point or the plurality of access points to which specific rates are associated if use of the access point or the plurality of access points is modified.

2. The method according to claim 1, wherein said subscribers or said group of subscribers identify themselves at least before, during or after obtaining a link to the network by way of an access-point-independent identification code.

3. The method according to claim 1, wherein said network is a mobile network whose access points wirelessly communicate with said subscribers or said group of subscribers in zones served by the access points.

4. The method according to claim 1, wherein the association of the specific rate to the access point or the plurality of access points most used by said subscriber or group of subscribers at least partly takes place in response to generating connecting data relating to telecommunication links obtained and used by a subscriber or group of subscribers of a different network.

5. The method according to claim 4, wherein the association of the specific rate to the access point or the plurality of access points most used by said subscriber or group of subscribers takes place on the basis of statistical relationships between the connecting data of access points of the specific network and the connecting data of access points of the different network by respective subscribers to both networks.

6. The method according to claim 1, wherein the step of generating connecting data includes associating said connecting data which identifies an access point used for each telecommunication link with a specific time period.

7. A telecommunication system arranged for access-point-dependent calculation of telecommunication rates, comprising:
   a telecommunication network;
   a recording unit operatively coupled to the telecommunication network and generating connecting data relating to telecommunication links obtained and used by a subscriber or a group of subscribers, said connecting data containing data identifying an access point used for each telecommunication link, and
   a processor unit operatively coupled to the recording unit and using said data identifying the access point used for each telecommunication link to associate a specific rate to an access point or a plurality of access points most used by said subscriber or group of subscribers,
   wherein the processor unit automatically modifies the access point or the plurality of access points to which specific rates are associated if use of the access points or the plurality of access points is modified.

8. The telecommunication system according to claim 7, wherein said telecommunication network is a mobile network and the access points of said telecommunication network are constituted by transmitters and receivers of said mobile network.

9. The telecommunication system according to claim 7, further comprising at least a connection for connecting to a different network, said recording unit and said connection receiving and recording connecting data on the use of access points of said different network.

10. The telecommunication system according to claim 9, wherein one of said networks is a nonmobile network and the other of said networks is a mobile network.

11. The telecommunication system according to claim 9, further comprising at least a connection for connecting to a different network, said recording unit and said connection receiving and recording connecting data on the use of access points of said different network.

12. The telecommunication system according to claim 11, wherein one of said networks is a nonmobile network and the other of said networks is a mobile network.

13. The telecommunication system according to claim 7, wherein the association of the specific rate to the access point or plurality of access points most used by said subscriber or group of subscribers takes place on the basis of statistical relationships between the connecting data of access points of the specific network and the connecting data of access points of the different network by respective subscribers to both networks.

* * * * *